United States Patent [19]

Lavicska

[11] Patent Number: 5,573,686
[45] Date of Patent: Nov. 12, 1996

[54] LAMP/HEATER FOR A WHEEL WELL IN A MOTOR VEHICLE

[76] Inventor: Mickey Lavicska, 2009 Sunset Ave., Utica, N.Y. 13502

[21] Appl. No.: 516,795

[22] Filed: Aug. 18, 1995

[51] Int. Cl.⁶ ..................................................... B60L 1/02
[52] U.S. Cl. ............................ 219/202; 296/198; 362/83; 392/426
[58] Field of Search ........................... 219/202; 392/407, 392/422, 426; 362/81–83, 78, 92; 296/198; 280/847–848

[56] References Cited

U.S. PATENT DOCUMENTS

| | | |
|---|---|---|
| 1,348,625 | 8/1920 | Briggs . |
| 1,422,528 | 7/1922 | Berringer ..................................... 362/83 |
| 1,443,290 | 1/1923 | Strong ........................................ 362/83 |
| 2,451,553 | 10/1948 | Hedquist et al. . |
| 3,341,222 | 9/1967 | Roberts . |
| 3,618,998 | 11/1971 | Swauger . |
| 3,902,752 | 9/1975 | Pelletier . |
| 4,089,537 | 5/1978 | Pralutsky . |
| 4,190,939 | 3/1980 | Keller . |
| 4,282,564 | 8/1981 | McJunkin, Jr. et al. .................. 362/83 |
| 4,378,120 | 3/1983 | Laine . |
| 4,735,427 | 4/1988 | Fuchs ....................................... 296/198 |
| 4,802,069 | 1/1989 | Chandler .................................. 362/83 |
| 5,108,129 | 4/1992 | Olsen . |

FOREIGN PATENT DOCUMENTS

| | | |
|---|---|---|
| 1906874 | 9/1970 | Germany . |
| 2827845 | 1/1980 | Germany . |
| 58-214475 | 12/1983 | Japan . |

Primary Examiner—Tu Hoang
Assistant Examiner—Raphael Valencia
Attorney, Agent, or Firm—Michael I. Kroll

[57] ABSTRACT

A multipurpose wheel well apparatus is provided for a wheel well in a quarter panel of a motor vehicle which consists of a structure for protecting the wheel well from stone, salt and moisture damage. A mechanism is provided for securing the protecting structure within the wheel well of the motor vehicle, so that the wheel well will resist impacts, stress and corrosion. A second mechanism is provided for supplying light and radiant heat to the wheel well for the purpose of assisting a motorist in changing a flat tire and for the purpose of melting ice and snow in the wheel well and in the tire treads of the vehicle.

12 Claims, 2 Drawing Sheets

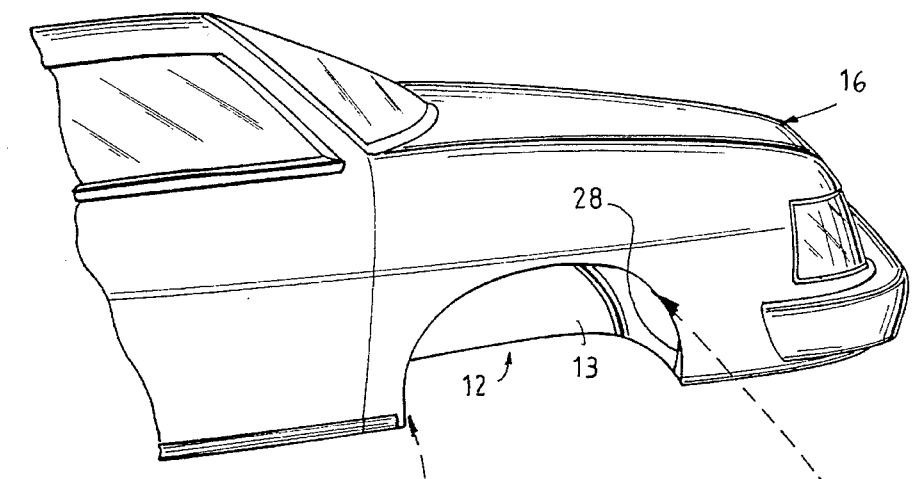
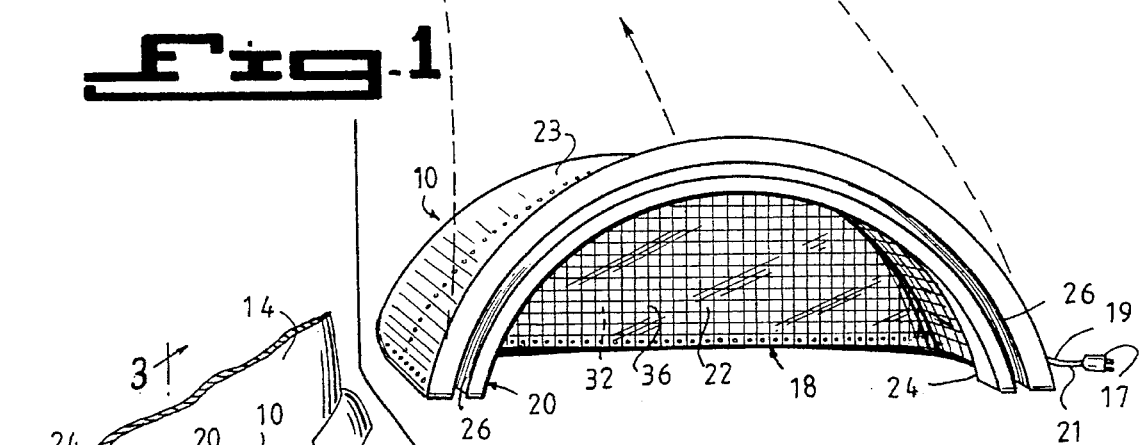
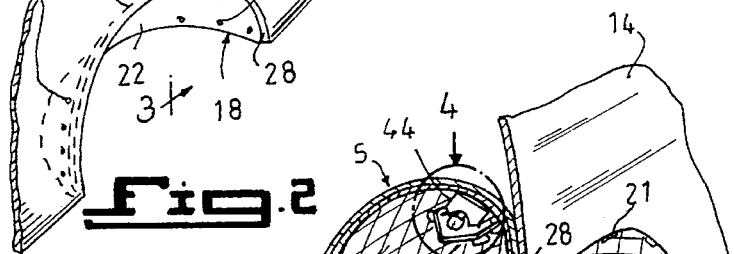
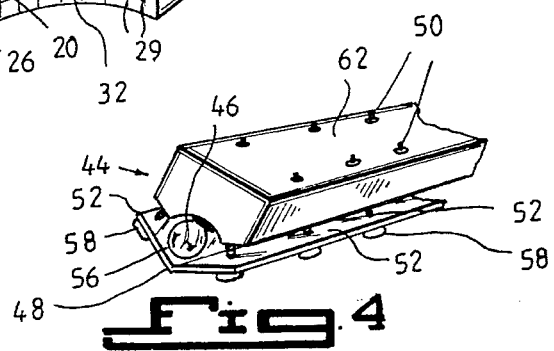

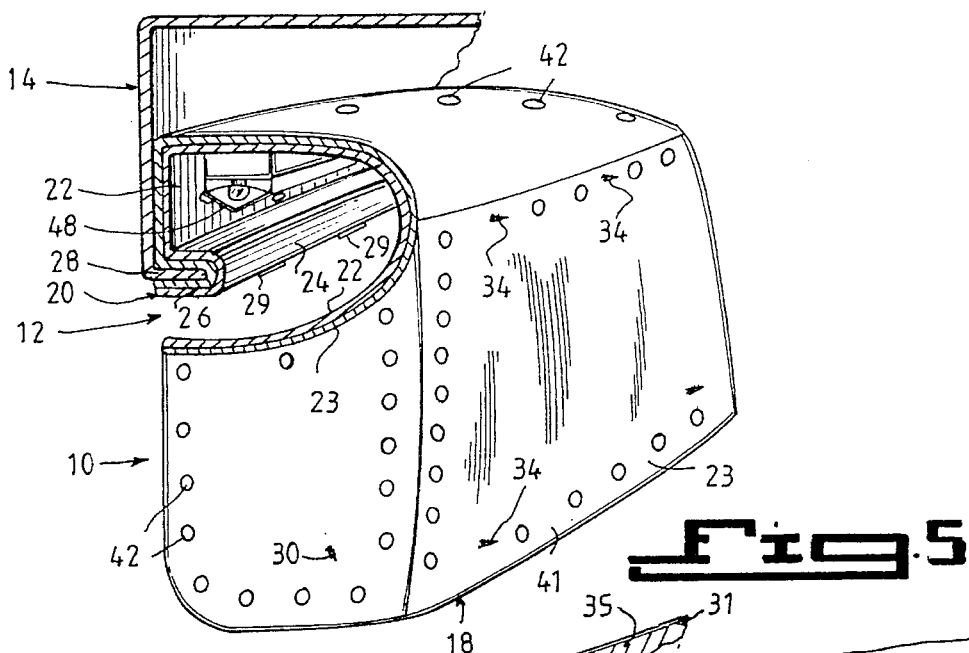
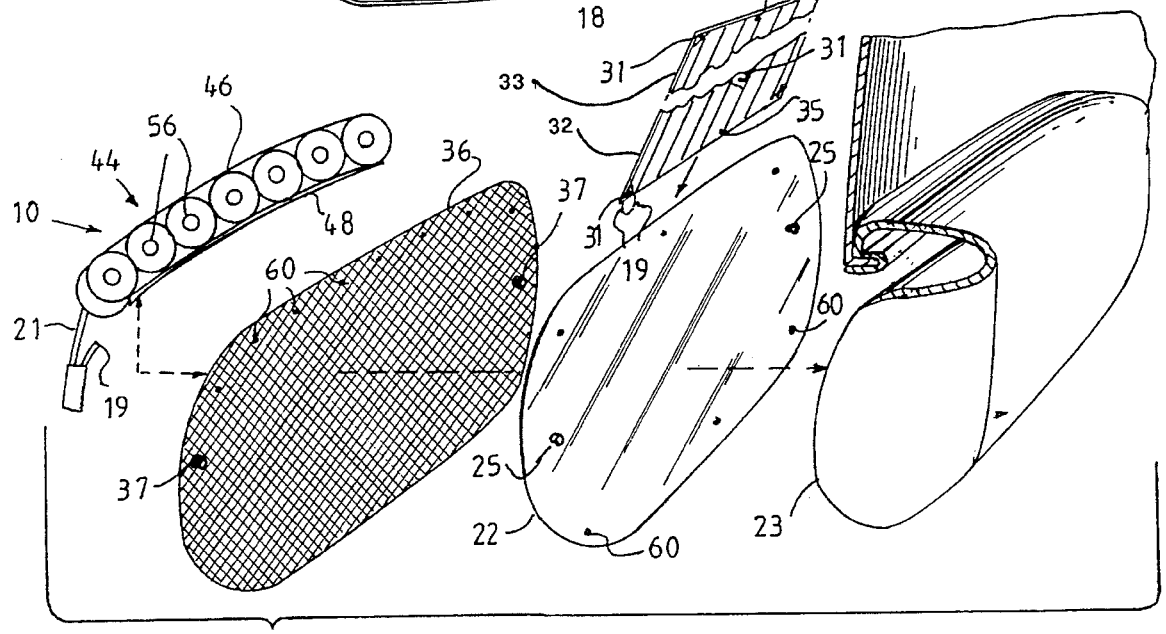
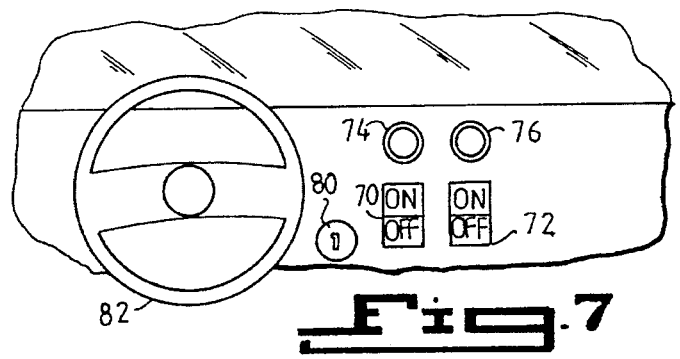

LAMP/HEATER FOR A WHEEL WELL IN A MOTOR VEHICLE

BACKGROUND OF THE INVENTION

1. Field of the Invention

The instant invention relates generally to shields and more specifically it relates to a multipurpose wheel well apparatus for a wheel well of a motor vehicle.

2. Description of the Prior Art

Numerous shields have been provided in prior art that are adapted to protect, defend and conceal various parts of motor vehicles. For example, U.S. Pat. Nos. 1,348,625 to Briggs; 3,341,222 to Roberts; 4,089,537 to Pralutsky; 4,378,120 to Laine; 5,108,129 to Olsen; and German patents DT 2827-845 to Jensen and P1,906,874 to Vossiek; and Japanese patent 58-214475 to Sugisawa all are illustrative of such prior art. While these units may be suitable for the particular purpose to which they address, they would not be as suitable for the purposes of the present invention as heretofore described.

SUMMARY OF THE INVENTION

A primary object of the present invention is to provide a multipurpose wheel well apparatus for a wheel well in a motor vehicle that will overcome the shortcomings of the prior art devices.

Another object is to provide a multipurpose wheel well apparatus for a wheel well in a motor vehicle, which will provide the lighting necessary to change a flat tire or perform other repairs on a dark night, and additionally to provide the lighting necessary for other drivers to see the tire changer and thus avoid hitting him.

An additional object is to provide a multipurpose wheel well apparatus for a wheel well in a motor vehicle which will provide radiant heat to the wheel well area. This will have three main benefits:

1. This radiant heat will facilitate the melting of snow and ice around the wheel well area. This will aid in the removal of flat tires or in the performing of general emergency repairs to the wheel well area.
2. This radiant heat will melt snow and ice in the treads of the tire thus increasing road traction in icy or snowy weather. Hitherto there has been no convenient way to prevent ice buildup in the tire treads of a moving motor vehicle.
3. The radiant heat will cause a continuous evaporation of the moisture in the wheel well area thus reducing rust and corrosion.

Another object is to provide a multipurpose wheel well apparatus for a wheel well in a motor vehicle, which will have a reflective surface which, in conjunction with the lighting feature, will aid the driver to spot damage to a tire. This reflective surface will further direct light to the hub of the axle, thus greatly increasing visibility in the wheel well area as a further assist to a driver changing a tire.

Another object is to provide a multipurpose wheel well apparatus for a wheel well in a motor vehicle, which will fit into the wheel well to protect the body and undercoating of the motor vehicle from stone, salt and moisture damage.

An additional object is to provide a multipurpose wheel well apparatus for a wheel well in a motor vehicle that can be removed and refitted in minutes, requiring only the removal of the wheel to do so.

A further object is to provide a multipurpose wheel well apparatus for a wheel well in a motor vehicle that is simple and easy to use.

A still further object is to provide a multipurpose wheel well apparatus for a wheel well in a motor vehicle that is economical in cost to manufacture.

Yet another object is to provide a multipurpose wheel well apparatus for a wheel well in a motor vehicle whose lighting and radiant heating mechanisms can be operated by switches, knobs, dials or the like on the dashboard of the motor vehicle.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a diagrammatic perspective view of a rear portion of a motor vehicle showing the instant invention ready to be installed within a rear wheel well.

FIG. 2 is a diagrammatic perspective view of the rear portion of the motor vehicle showing the instant invention installed within the rear wheel well.

FIG. 3 is a diagrammatic cross section perspective view taken along line 3—3 in FIG. 2 but with the safety screen removed so that the radiant heating element can be seen.

FIG. 4 is a diagrammatic enlarged view with parts broken away taken in the area of the dotted encirclement indicated by arrow 4 in FIG. 3 illustrating the light bulb assembly of the instant invention in greater detail.

FIG. 5 is a rear perspective view with the upper left portion of the protecting structure broken away taken in direction of arrow 5 in FIG. 3.

FIG. 6 is a diagrammatic perspective exploded view of the instant invention as depicted in FIG. 5.

FIG. 7 is a diagrammatic front elevation view of the dashboard of a motor vehicle showing the switches for activating the lighting and radiant heating mechanisms of the instant invention.

DETAILED DESCRIPTION OF THE PREFERRED EMBODIMENTS

Turning now descriptively to the drawings, in which similar reference characters denote similar elements throughout the several views, FIG. 1 shows the multipurpose wheel well apparatus 10 ready to be installed within a rear wheel well 12 of a motor vehicle 16. After installation, the multipurpose wheel well apparatus 10 will rest flush against the back wall 13 of the wheel well 12 of the motor vehicle 16. The remaining figures illustrate various aspects of the instant invention.

The Multipurpose Wheel Well Apparatus

As best seen in FIGS. 1, 3, 5, and 6, the multipurpose wheel well apparatus 10, comprises a protecting structure 18 for protecting the wheel well 12 from stone, salt and moisture damage; a radiant heating element 32 riveted to the protecting structure 18 and electrically connected to the electrical system of the motor vehicle for melting ice and snow in the wheel well area and also for melting ice in the tire treads of the vehicle; a strip light assembly 44 riveted to the protecting structure 18 and electrically connected to the electrical system of the motor vehicle for providing illumination in the wheel well area for tire changing and other roadside repairs; a safety screen 36 to protect the radiant heating element 32, the strip light assembly 44, and the protecting structure 18 from rocks and other large debris thrown up from the road surface; and two switches 70, 72 on the dashboard in the interior of the motor vehicle electrically connected to the motor vehicle's electrical system, to the strip light assembly 44, and to the radiant heating element 32 for activating the light assembly and the radiant heating element.

The Protecting Structure

As can be seen in the drawings, particularly FIGS. 1, 3, and 5, the protecting structure 18 comprises a highly polished concave stainless steel shield 22 and a concave polypropylene liner 23 to which it is riveted. (Due to the cost and difficulty of fabricating stainless steel structures, a thin layer of highly polished stainless steel which is easily workable is riveted to the much more flexible but still very sturdy propylene liner.)

A mechanism 20 is for securing the protecting structure 18 within the wheel wells 12, 12 of the front and rear quarter panels of the motor vehicle 16, so that the wheel wells 12, 12 will resist impacts, stress and corrosion.

The protecting structure 18 is shaped to fit snugly inside of the wheel well 12 such that the interior of the wheel well 12 above the wheel is substantially entirely overlaid by said protecting structure 18. Therefore, when the protecting structure 18 as a whole is considered, it can be said that its inner surface is the inner surface of the highly polished stainless steel shield and its outer surface is the outer surface of the concave polypropylene liner. Therefore the protecting structure 18 acts just like a piece of very flexible stainless steel—not only very nearly as strong as a piece of solid stainless steel but also highly reflective on its inner surface.

The highly polished stainless steel shield 22 serves the functions of protecting the wheel well area from whatever small pebbles bounce through the safety screen and also enables easy inspection of the tire due to the reflective surface of the shield, and radiates both light and radiant heat toward the central portion of the wheel well thus facilitating the illumination of the wheel well area and aiding in the melting of ice and snow in the area, especially in the treads of the tires.

The securing mechanism 20 for securing the protecting structure 18 of the multipurpose wheel well apparatus within the wheel well of a vehicle and above the tire located therein, is, as a primary attachment mechanism, a flange 24 formed along an upper edge of the protecting structure 18 having a groove 26 therealong, so that the groove 26 can snap fit onto a lip 28 on the front or rear quarter panel extending about the front or rear wheel well 12, 12.

As can be most clearly seen in FIGS. 2, 3 and 5, this manner of constructing the securing mechanism 20 assures that no portion of the protecting structure 18, flange 24, or groove 26 extends outside of the quarter panels 14. Thus the multipurpose wheel well apparatus 10 remains entirely within the wheel well 12. This ensures that the multipurpose wheel well apparatus 10 is not easily visible during casual observation, thus not detracting from the appearance of the vehicle 16 to which it is attached. Additionally, this design avoids the danger inherent in having unnecessary external protrusions on a moving vehicle.

The securing mechanism 20 can further include, as a secondary attachment mechanism, a plurality of fasteners 30, spaced apart and extending through the bottom edge of the protecting structure 18 and into a back wall 13 (shown in FIG. 1) of a wheel well 12. These fasteners 30 are shown in this preferred location in FIG. 5. Preferably, the fasteners 30 are stainless steel screws 34. Most preferably for extra security, the securing mechanism 20 can further include, as an additional secondary attachment mechanism, a plurality of fasteners 29, spaced apart and extending through the bottom surface of the flange 24.

The securing mechanism 20 can further include, as a secondary attachment mechanism, a plurality of magnets 42 embedded in the outer surface 41 of the concave liner 23.

Thus, as can be seen in the drawings, the protecting structure 18 covers substantially the entire wheel well 12 above a wheel of the vehicle 16; both the front and rear areas therein are protected from objects or substances thrown up from the wheel when the vehicle 16 is in motion.

The concave liner 23 with the flange 24 is fabricated out of a thermoplastic material such as polypropylene so as to be capable of maintaining structural integrity within the temperature range of minus 40° F. to plus 120° F. Polypropylene and chemically similar thermoplastic materials are unaffected by the chemicals spread on icy roads in the winter. These materials are scratch and dent resistant. They can also be compression molded to vary in thickness between one eighth of an inch to one quarter of an inch.

The Radiant Heating Element

As shown in FIG. 1, the protecting structure 18 has wire leads 19 leading to the radiant heating element 32 which rests against the inner surface 38 of the concave shield 22. The radiant heating element 32 provides radiant heat to the wheel well area 12 to melt ice and snow in that area and also to melt ice or snow caught in the treads of the tires.

As shown in FIG. 6, the radiant heating element 32 comprises a radiant heating grid 33 with rivet holes 31 so that the radiant heating grid may be riveted to the inner surface 38 of the stainless steel shield 22. The connector leads 21, 19 electrically connect the radiant heating element 32 with the electrical system of the motor vehicle.

The Strip Light Assembly

As shown in FIG. 1, the protecting structure 18 also has wire leads 19, 21 leading to the strip light assembly 44 (shown in FIGS. 4 and 6) attached to the upper portion of the inner surface 38 of the concave shield 22. The strip light assembly 44 provides light to the area of the wheel hub which is useful for changing a flat tire on a dark night.

As shown in FIG. 4, the strip light assembly 44 consists of a light assembly base 62 having a series of internally threaded molded light bulb bases or sockets (not shown), each socket having a reflector with a threaded base screwed into the socket (not shown). Into each reflector is screwed a 12 volt threaded light bulb 56. A lens cover 48 having lens screw holes 52 is held onto the light assembly base 62 by thumb screws 58 in each lens screw hole 52. Rivets 50 in the light assembly base 62 attach the strip light assembly 44 to the upper portion of the inner surface 38 of the concave shield 22.

The Safety Screen

The protecting structure 18 and the radiant heating element 32 which rests against its inner surface are overlaid by a safety screen 36 which assists in large part in preventing the larger rocks from smashing into the radiant heating element 32 and into the concave stainless steel shield 22 which would mar its highly polished finish.

As shown in FIG. 6, the safety screen 36 is held to the stainless steel shield 22 by two knurl nuts 37, 37 at either end of the screen. Upon insertion and tightening, the knurl nuts 37, 37 pass successively through holes in the safety screen 36, holes 35, 35 in the radiant heating grid 33, and screw into holes 25, 25 in the stainless steel shield 22.

The Two Switches on the Dashboard

As shown in FIG. 7, there are two switches 70, 72 on the dashboard in the interior of the motor vehicle electrically connected to the electrical system of the vehicle, to the strip light assembly 44, and the radiant heating element 32 for activating the strip light assembly 44, and the radiant heating element 32.

When the wheel well light switch 70 is activated, the wheel well light indicator light 74 illuminates yellow, and all four wheel wells are illuminated, thus facilitating changing tires, performing other needed repairs, and assisting passing drivers in seeing the motorist at work. When the wheel well heat switch 72 is activated, the wheel well heat indicator light 76 illuminates red, and the radiant heating elements of the instant invention are activated in all four wheel wells, thus melting snow and ice in the wheel well areas as well as any ice or snow in the tire treads of the vehicle.

In addition, when it is necessary to change a tire on a cold wintery day, the radiant heat from the radiant heating element warms the cold hands of the motorist thus further facilitating tire changing and making other repairs.

It is interesting to note that since the radiant heat from the radiant heating element is transmitted through space by infra-red radiation (which is electromagnetic radiation in the wavelength range from about 0.75 to 1000 micrometers) and the light from the strip light assembly is electromagnetic radiation in the wavelength range between about 400 and 800 nanometers, the radiant heat from the radiant heating element and the light from the light assembly are both forms of electromagnetic radiation.

In prior art vehicles, without the multipurpose wheel well apparatus installed within the wheel wells, debris and corrosion will be deposited within the wheel wells. In such prior art vehicles, there will be no means to melt ice and snow buildup within the wheel wells, and changing tires will be difficult, if not sometimes impossible, without light and radiant heat.

Although the illustrations show multipurpose wheel well apparatus 10 installed in a Volvo of series number 140, 160, 240 or 260, the instant invention, with minor modifications apparent to those skilled in the art can be adapted for use in the wheel wells of any motor vehicle having wheel wells. It is constructed to fit in both the front and back left and right wheel wells 12 of the motor vehicle 16 to eliminate premature metal corrosion along the interior and exterior of the wheel wells 12. Each multipurpose wheel well apparatus 10 can be removed and refitted in minutes, requiring only the removal of each of the wheels to do so.

The multipurpose wheel well apparatus 10 can be fabricated in various colors to match the decor of the body of the motor vehicle. It can also be made with various patterns and shapes printed thereon, to enhance the appearance of the multipurpose wheel well apparatus 10. To appeal to the younger driver, the lens cover 48 can be in a variety of colors to yield unusual effects as the wheel well lights are activated at night. For the real car lover who wants to really show off his wheels, the lights can be of the flashing variety. So it is envisioned that not only will the instant invention have great utilitarian value, but also will be such as to enhance the aesthetic beauty of one's car as well.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A multipurpose wheel well apparatus for a wheel well of a motor vehicle having an electrical system and having tires with treads comprising:

a) a protecting structure having an inner surface and an outer surface, said protecting structure configured to fit inside of a wheel well of a motor vehicle for protecting the wheel well from stone, salt and moisture damage;

b) attachment means for securing the protecting structure of the multipurpose wheel well apparatus within the wheel well of a vehicle and above a tire located therein; and c) means for supplying electromagnetic radiation to the wheel well.

2. The multipurpose wheel well apparatus of claim 1, wherein the electromagnetic radiation is light, whereby illumination is provided for working in the vicinity of the wheel well.

3. The multipurpose wheel well apparatus as recited in claim 2, wherein the inner surface of the protecting structure has a mirror surface, whereby light is reflected toward the center of the wheel well thus facilitating tire changing, and the task of viewing that portion of the tire in the upper portion of the wheel well is facilitated.

4. The multipurpose wheel well apparatus of claim 1, wherein the electromagnetic radiation is infrared radiation, whereby radiant heat is provided for melting ice and snow in the vicinity of the wheel well and in the tire treads of the vehicle.

5. The multipurpose wheel well apparatus of claim 4, wherein the inner surface of the protecting structure has a mirror surface, whereby the radiant heat is reflected onto the tire treads and into the wheel well for melting snow and ice therein.

6. The multipurpose wheel well apparatus as recited in claim 1, further including a secondary attachment means comprising a plurality of magnets embedded in the outer surface of the protecting structure of the multipurpose wheel well apparatus.

7. The multipurpose wheel well apparatus as recited in claim 2, further including a secondary attachment means comprising a plurality of magnets embedded in the outer surface of the protecting structure of the multipurpose wheel well apparatus.

8. The multipurpose wheel well apparatus as recited in claim 4, further including a secondary attachment means comprising a plurality of magnets embedded in the outer surface of the protecting structure of the multipurpose wheel well apparatus.

9. The multipurpose wheel well apparatus as recited in claim 1, wherein the protecting structure comprises a highly polished stainless steel shield and a polypropylene liner to which the stainless steel shield is riveted.

10. The multipurpose wheel well apparatus as recited in claim 9, further comprising a safety screen for protecting the stainless steel shield from rocks thrown up from a road surface.

11. The multipurpose wheel well apparatus as recited in claim 10, further comprising switches on a dashboard for activating the light assembly and the radiant heating element.

12. The multipurpose wheel well apparatus as recited in claim 1, further comprising a safety screen for protecting the protecting structure from rocks thrown up from a road surface.

* * * * *